US008645682B2

(12) United States Patent
Biswas

(10) Patent No.: US 8,645,682 B2
(45) Date of Patent: Feb. 4, 2014

(54) METHODS AND APPARATUS FOR SHARING REAL-TIME USER CONTEXT INFORMATION

(75) Inventor: Debmalya Biswas, Lausanne (CH)

(73) Assignee: Nokia Corporation, Espoo (FI)

(*) Notice: Subject to any disclaimer, the term of this patent is extended or adjusted under 35 U.S.C. 154(b) by 30 days.

(21) Appl. No.: 13/285,148

(22) Filed: Oct. 31, 2011

(65) Prior Publication Data

US 2013/0111205 A1 May 2, 2013

(51) Int. Cl.
*H04L 29/06* (2006.01)

(52) U.S. Cl.
USPC .......................................................... 713/153

(58) Field of Classification Search
USPC .......................................................... 713/153
See application file for complete search history.

(56) References Cited

U.S. PATENT DOCUMENTS

| | | | | |
|---|---|---|---|---|
| 7,856,100 | B2* | 12/2010 | Wang et al. ..................... | 380/30 |
| 2007/0140479 | A1* | 6/2007 | Wang et al. ..................... | 380/30 |
| 2009/0197582 | A1 | 8/2009 | Lewis et al. | |
| 2010/0017627 | A1 | 1/2010 | Princen et al. | |
| 2010/0299534 | A1 | 11/2010 | Shim et al. | |
| 2011/0083111 | A1* | 4/2011 | Forutanpour et al. ......... | 715/863 |
| 2011/0264920 | A1 | 10/2011 | Rieffel et al. | |
| 2012/0278760 | A1* | 11/2012 | Cerny et al. ................... | 715/810 |

OTHER PUBLICATIONS

Biswas, D. et al., Privacy Preserving Profiling for Mobile Services, Procedia Computer Science 10 (2012), The 9th International Conference on Mobile Web Information Systems (MobiWIS), Aug. 10, 2012, doi:10.1016/j.procs.2012.06.073, pp. 569-576.
Jeckmans, A. et al., Privacy-preserving profile matching using the social graph, International Conference on Computational Aspects of Social Networks (CASoN), 2011, 20111019 IEEE, doi:10.1109/CASON.2011.6085916, pp. 42-47.
Biswas, D. et al., Privacy-Preserving Outsourced Profiling, 12th Conference on Commerce and Enterprise Computing (CEC), 2010 IEEE, 20101110, doi:10.1109/CEC.2010.39, pp. 136-143.
Wang, H. et al., Multi-use and unidirectional identity-based proxy re-encryption schemes, Information Sciences 180 (2010), 20101015, Elsevier, Amsterdam, NL, pp. 4042-4059.
Pascal Paillier; Public-Key Cryptosystems Based on Composite Degree Residuosity Classes [Published in J. Stern, Ed., Advances in Cryptology { EUROCRYPT'99, vol. 1592 of Lecture Notes in Computer Science, pp. 223 {238, Springer-Verlag, 1999.].

(Continued)

*Primary Examiner* — Kambiz Zand
*Assistant Examiner* — Stephen Sanders
(74) *Attorney, Agent, or Firm* — Harrington & Smith

(57) ABSTRACT

Improved systems and techniques for secure delivery of data. One or more data providers deliver encrypted data to a storage entity. For each of one or more authorized recipients of data delivered by a data provider, the data provider generates a re-encryption key and delivers it to the storage entity. The storage entity uses a recipient's re-encryption key to re-encrypt data to be delivered to the recipient. The recipient is able to use its own key to decrypt data that has been encrypted with the data provider's key and re-encrypted with the re-encryption key of the recipient. Delivery of data may be managed to insure that it reflects a consistent condition. Data may be homomorphically encrypted by each of a plurality of data providers and processed in aggregate at the storage entity, with a recipient being able to decrypt the aggregated data but not individual elements of the aggregated data.

20 Claims, 3 Drawing Sheets

(56) References Cited

OTHER PUBLICATIONS

Tom Simonite; *A Cloud that Can't Leak*; Monday, Aug. 8, 2011; http://www.technologyreview.com/printer_friendly_article.aspx?id=38239 (2 pages).

Kristin Lauter, et al.; *Can Homomorphic Encryption be Practical?* Proceedings of the 3rd ACM Cloud Computing Security Workshop, CCSW 2011, Chicago, IL, USA, Oct. 21, 2011. ACM 2011: pp. 113-124.

Giuseppe Ateniese, et al.; *Proofs of Storage from Homomorphic Identification Protocols*; ASIACRYPT 2009; vol. 5912 (2009), pp. 319-333.

Ivan, et al.; *Proxy Cryptography Revisited*; Proceedings of the Network and Distributed System Security Symposium, NDSS 2003 (20 pages).

Canny; *Collaborative filtering with privacy via factor analysis*; In SIGIR '02: Proceedings of the 25th annual international ACM SIGIR conference on Research and development in information retrieval (2002), pp. 238-245.

Williams, et al.; *The Blind Stone Tablet: Outsourcing Durability to Untrusted Parties*; Proceedings of the Network and Distributed System Security Symposium, NDSS 2009, San Diego, California, USA, Feb. 8th-Feb. 11th, 2009. The Internet Society 2009 (16 pages).

Atemiese, et al.; *Improved Proxy Re-Encryption Schemes with Applications to Secure Distributed Storage*; ACM Trans. Inf. Syst. Secur., vol. 9, No. 1. (2006), pp. 1-30.

G Weikum, G Vossen: *Transactional Information Systems: Theory, Algorithms, and the Practice of Concurrency Control and Recovery: Theory, Algorithms, and the Practice of Concurrency Control and Recovery*; Morgan Kaufmann, et al. May 21, 2001 (whole book—852 pages).

\* cited by examiner

METHODS AND APPARATUS FOR SHARING REAL-TIME USER CONTEXT INFORMATION

FIELD OF THE INVENTION

The present invention relates generally to data communication. More particularly, the invention relates to systems and techniques for providing information relating to the status and activities of a user to authorized parties while protecting user privacy.

BACKGROUND OF THE INVENTION

Personal communication devices have become increasingly widespread in recent years. As the capabilities of devices have increased, they have become increasingly relied on by users. One important factor enhancing the capabilities of devices is the availability of third-party applications. Numerous useful features may be made available to users by such third-party applications, and many third-party applications have become very widely known and used.

One commonly used model for the distribution of third-party applications is the sale of advertisements associated with the applications. A user agrees to receive advertisements during his or her use of the application, and the collection of fees from advertisers provides revenue for the development and distribution of the application.

The information collection capabilities of modern devices allow for customization of services provided by third-party applications, and also allows for customization of the delivery of advertisements. A service provider can design advertisements directed to narrowly targeted categories of users. A user's device is capable of collecting extensive information about the user's activities and interests, and this information can be processed to allow for selection of advertisements likely to appeal to the user based on those interests. In addition, information collected from users can be used to design applications and features and to allow for targeting of particular applications and features to users who may be interested in those applications and features.

BRIEF SUMMARY

In one embodiment of the invention, an apparatus comprises at least one processor, and memory storing a program of instructions. The program of instructions are configured to, with the processor and the memory, configure the apparatus to perform actions comprising receiving sensor data encrypted with a private encryption key of a data provider, re-encrypting the sensor data with a re-encryption key generated by the data provider for an authorized recipient, and, upon a request from an authorized recipient, transferring the re-encrypted sensor data to the authorized recipient.

According to another embodiment of the invention, the apparatus the sensor data comprises a plurality of data elements and delivery of data comprises delivering a set of data elements. The actions further comprise, during the delivery of the data from the data provider, insuring that data elements of a set being delivered reflect a collection time consistent across the data elements of the set.

According to another embodiment of the invention, a method comprises configuring at least one processor to cause an apparatus to perform the steps of receiving sensor data encrypted with a private encryption key of a data provider, re-encrypting the sensor data with a re-encryption key generated by the data provider for an authorized recipient, and, upon a request from an authorized recipient, transferring the re-encrypted sensor data to the authorized recipient.

In another embodiment of the invention, a non-transitory computer readable medium stores a program of instructions. Execution of the program of instructions by a processor configures an apparatus to perform actions comprising receiving sensor data encrypted with a private encryption key of a data provider, re-encrypting the sensor data with a re-encryption key generated by the data provider for an authorized recipient, and, upon a request from an authorized recipient, transferring the re-encrypted sensor data to the authorized recipient.

These and other embodiments and aspects are detailed below with particularity.

DETAILED DESCRIPTION

Embodiments of the present invention recognize that it is technically possible to mine data collected by sensor components of a user device, and that mining and analyzing such data can reveal a high level of detail about the activities of the user. Embodiments of the present invention also recognize that users are concerned about the privacy of their information and will not accept mining and analysis of their data unless they can be assured that their data will be protected.

Embodiments of the invention also recognize that information reflecting the current activities of users is particularly valuable. Observation of transactions and activities engaged in by users, and the analysis of these transactions, helps to provide information indicating the user's immediate needs and receptiveness to advertisements based on those needs. A user device may include a number of components that may operate to sense user status and activities, such as a user data interface, a position locator, and a voice dialer. Information obtained simultaneously by several components may reflect a transaction being engaged in at a particular time or may otherwise provide information relating to the user's status or activities at a particular time. Embodiments of the present invention therefore recognize that information that is collected consistently across sensor components, such as from multiple components at the same time, is particularly valuable, and provide mechanisms to assure that information from multiple sensor components will be collected in a consistent fashion, so that information collected from different components at different times is not misinterpreted as relating to the same transaction or activity.

Embodiments of the present invention further recognize that storing a large amount of historical data can exceed storage requirements of a typical user device, or at least can restrict the amount of storage available for other uses. Users are not likely to be willing to devote their storage space to satisfy what they perceive to be the needs of unknown third parties. Therefore, it is necessary to provide external space in which user data can be stored, and the need to provide such space renders it even more important to assure users that their information will be protected.

Figure 1:
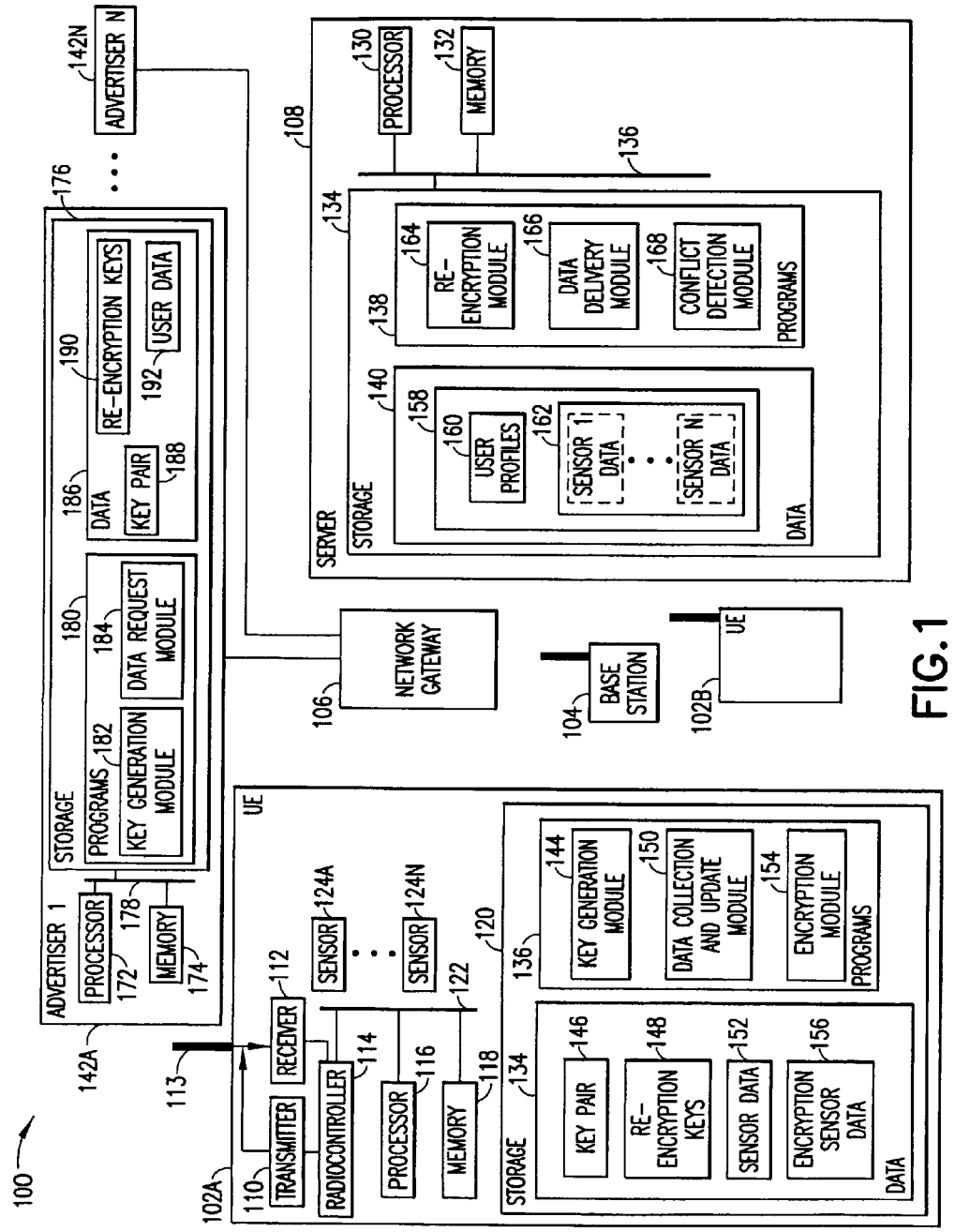
FIG. 1 illustrates a system according to an embodiment of the present invention.

FIG. 1 illustrates a system 100 according to an embodiment of the present invention. The system 100 comprises a plurality of user devices, of which UEs 102A and 102B are illustrated here. The UEs 102A and 102B and other UEs, may be thought of as data providers, furnishing data for use by authorized recipients.

The UEs 102A and 102B may be served by a base station 104, which provides the UEs 102A and 102B with access to a wireless network gateway 106. The wireless network gateway 106 provides the UEs 102A and 102B with access to numerous services, of which the storage and processing server 108 is of particular interest. The storage and processing server 108 receives data that is exported in encrypted form by the UEs 102A and 102B. The storage and processing server 108 does not have access to the keys needed to decrypt the data, so the storage and processing server 108 can be an untrusted cloud server.

Additional details are illustrated here for the UE 102A and the server 108. It will be recognized that the UE 102B and similar UEs may include similar components to those illustrated here for the UE 102A, and that the base station 104 and network gateway 106 may include components similar to those of similar elements known in the art.

The UE 102A may comprise a transmitter 110, receiver 112, antenna 113 and radiocontroller 114. The UE 102A may also comprise a processor 116, memory 118, and storage 120, communicating with one another and with the radiocontroller 120 over a bus 122.

The UE 102A may also include sensors 124A, . . . , 124N, that may collect information relating to user activities and status. The sensors 124A, . . . , 124N may include, for example, GPS receivers, accelerometers, user interface devices, and any other devices or elements suitable for collecting data and which are desired for inclusion in the UE 102A. The UE 102A may include a set of programs 126, which may be implemented as software modules residing in storage 120 and transferred to memory 118 as needed for execution by the processor 116. The UE 102A may also store data 128, which may include data such as collected sensor data, encryption keys, and other data needed for carrying out embodiments of the present invention. Additional details of the programs 126 and data 128 are described below.

The server 108 may comprise a processor 130, memory 132, and storage 134, communicating with one another over a bus 136. The server 108 may also store a set of programs 138 and data 140.

Authorized third parties, such as advertisers 142A, . . . , 142N may be provided with access to the stored user information that has been exported to the server 108. The advertisers 142A, . . . , 142N are shown here as gaining access to the server 108 through the wireless network gateway 106.

In order to allow authorized parties, such as one or more of the advertisers 142A, . . . , 142N, to receive collected data from users, embodiments of the present invention use encryption mechanisms to allow secure storage of data on the server 108. The data is encrypted, and encryption keys are managed, in such a way that operators of the server are unable to gain access to the data, and parties such as the advertisers 142A, . . . , 142N are unable to gain access to the data unless authorized.

Delivery of data from one entity to another may conveniently be thought of as taking the form of transactions. A transaction may be viewed as the delivery of a complete set of values to an entity, whether this entity is a storing entity such as the server 108, or a receiving entity such as one of the advertisers 142A, . . . , 142N. As will be seen below, embodiments of the present invention provide for mechanisms to insure that multiple data elements will be delivered in such a way as to insure that the aggregated data elements provide an accurate perspective at the time they are delivered. Multiple data elements, collected from various sensors of a user device, and present in storage of the user device at the same time, may together reflect the status and activities of the user. The delivery of data items that have been collected at different times, and that have not all been present in storage at the same time, or that reflect different collection times and relate to different conditions or events, may provide an inaccurate perspective. Therefore, as discussed in greater detail below, embodiments of the present invention insure that a complete concurrent set of data will be delivered, or that no data elements will be delivered, with a delivery procedure being aborted if data changes during the delivery procedure or if the delivery procedure partially fails so that delivery of some data elements proceeds while delivery of other data elements is interrupted. Transactions are managed so that the data delivered at each transaction provides a consistent perspective. Each transaction brings the system from one consistent state to another.

A UE such as the UE 102A exports encrypted data to the server 108, and also delivers appropriate keys, with each key being usable by a specific recipient to gain access to the user's data. In addition, or as an alternative, the UE may subject data to homomorphic encryption. Homomorphic encryption allows for data to be encrypted in such a way that the encrypted data can be operated on and then decrypted to recover the plaintext as modified by the operation.

The UE 102A employs a key generation module 144, which generates a public key cryptography key pair 146 comprising a public key $Pb_{102A}$ and a private key $Pr_{102A}$. The public key can be freely distributed, and used by other parties to encrypt data to be delivered to the UE 102A. The key generation module 144 also generates re-encryption keys 148, with a re-encryption key being generated for each third party that is authorized to gain access to user data of the UE 102A, such as data collected by the various sensors 124A, . . . , 124N. For example, if the advertiser 142A is authorized to receive data from the UE 102A, the key generation module 144 generates a re-encryption key $Rk_{142A}$, using the UE 102A's private key $Pr_{102A}$ and the advertiser 142A's private key $Pr_{142A}$. The advertiser 142A can use the key $Rk_{142A}$ to encrypt ciphertext resulting from encryption by the key $Pb_{102A}$. Encryption using the key $Pb_{102A}$ produces ciphertext that needs to be decrypted by the private key $Pr_{102A}$. The re-encryption key $Rk_{142A}$ allows the advertiser 142A to use its own private key $Pr_{142A}$ to decrypt ciphertext resulting from encryption by the key $Pb_{102A}$ and subsequent encryption by the key $Rk_{142A}$. The server 108 does not have access to the key $Pr_{142A}$, and so cannot decrypt the ciphertext. Similarly, none of the advertisers 142B, . . . , 142N can decrypt data that has been re-encrypted using the key $Rk_{142A}$, because they do not have the key $Pr_{142A}$.

The UE 102A also employs a data collection and export module 150, that periodically collects sensor data 152 from the various sensors 124A, . . . , 124N and delivers the data to the server 108. Before any collected data is delivered to the server 108, it is encrypted using an encryption module 154, which suitably uses the public key $Pb_{102A}$ to create encrypted data 156 that can be decrypted only using the UE 102's private key $Pr_{102A}$, or a combination of a re-encryption key that has been created for a recipient, together with the recipient's own private key.

Suppose, then, that the UE 102A wishes to send a message $m_{102A}$. It uses the key $Pb_{102A}$ to create a ciphertext message $C_{102A}$. This message is delivered to the server 108. The ciphertext message can then be retrieved by the advertiser 142A and re-encrypted using the key $Rk_{142A}$ to produce a re-encrypted cipertext message $C_{R142A}$. The advertiser 142A can then uses its private key $Pr_{142A}$ to recover the message $m_{102A}$.

In one or more embodiments of the present invention, the UE 102A first generates a re-encryption key for each authorized party and delivers it to the server 108. The server 108 stores re-encryption keys and other user information in a database 158. Specifically, the user information may be stored in a user profile set 160. The server 108 also stores sensor data for each of a plurality of sensors. In the present example, a sensor data set 162 stores sensor data for each of a plurality of users for sensors 1, ..., N. For example, the UE 102A may periodically deliver sensor data for the sensors 124A, ..., 124N, where this data and data collected from corresponding sensors of other UEs and devices may be stored in the sensor data set 162. The sensor data set 162 may suitably take the form of tables, with one table corresponding to each corresponding sensor, such as a table for accelerometer data, a table for GPS data, and the like. Each table may include a set of records, with each record including the data a sensor of one device. For example, in a table of accelerometer data, one record may include data from the accelerometer of the UE 102A, one record may include data from the accelerometer of the UE 102B, and so on. Each record may suitably include a user ID, a timestamp, and one or more sensor values.

The programs 138 employed by the server 108 may comprise a re-encryption module 164 for re-encrypting data for delivery to an authorized entity, a data delivery module 166 for managing the transfer, and a conflict detection module 168, which, prevents delivery of data that is currently being updated.

The advertiser 142A may suitably comprise a processor 172, memory 174, and storage 176, suitably communicating over a bus 178. The advertiser may store programs 180, suitably including a key generation module 182 and a data request module 184, and data 186, including a key pair 188, re-encryption keys 190, and user data 192.

To simplify the discussion, refer to the following functions:
  $KGEN(1^k)$ outputs a public-private key pair $(A_{pb}, A_{pr})$.
  $ENC(A_{pb}, m)$ outputs $C_{A1}$, the message m encrypted using the public key $A_{pb}$.
  $PRK(A_{pr}, B_{pb})$ outputs a re-encryption key $rk_{A \to B}$.
  $RENC(rk_{A \to B}, C_{A1})$ outputs the ciphertext $CB_{b2}$ generated by re-encrypting $C_{A1}$ under $rk_{A \to B}$.
  $DEC(B_{pr}, C_{B2})$ decrypts $CB_{b2}$ using $B_{pr}$, returning the message m.

A homomorphic encryption mechanism $HE=(ENC_H, DEC_H)$ satisfies the following property for two positive integers a and b:

$$DEC_H(ENC_H(a) \times ENC_H(b)) = a+b.$$

The homomorphic encryption mechanism is public-key, allowing any party to perform the encryption operation ENC( ).

The tables of sensor data may be thought of as corresponding respectively to each sensor s. Both the sensor tables, and the user profiles, may employ UserID as a primary lookup index. The following functions may be used:
  update ($s_j$, $U_i$, $c_j$), with the semantics that the record $U_i$ of the sensor table $s_j$ with the lookup index $U_i$ is updated to record value $c_j$.
  select($s_j$, $U_i$), returns the corresponding record value $c_j$.

Figure 2:
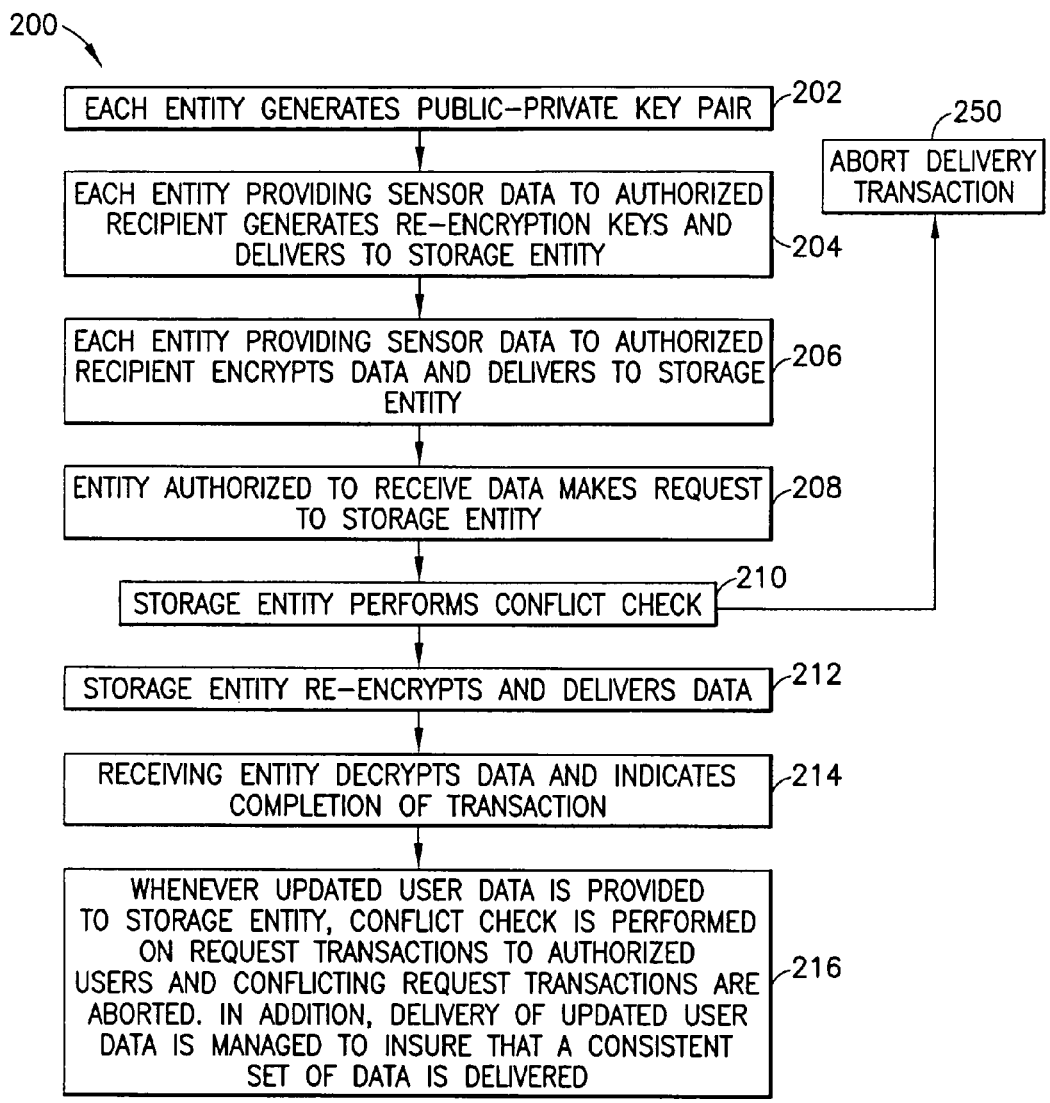
FIG. 2 illustrates a process according to an embodiment of the present invention.

FIG. 2 illustrates a process 200 of securing and delivering data according to an embodiment of the present invention. At step 202, each entity $C_i$ runs the function $KGEN(1^k)$ to generate a public-private key pair $(C_{ipb}, C_{ipr})$. The entities $C_i$ may suitably include UEs and advertisers or other entities that may be authorized to receive user data. In the case of the system 100, the function $KGEN(1^k)$ may be performed by the key generation module 144.

At step 204, each entity $U_i$ that is delivering data for the use of authorized recipients generates a re-encryption key and delivers it to a storage entity At step 206, each entity $U_i$ that is delivering data for the use of authorized recipients encrypts its sensor data and delivers it to the storage entity. In the case of the system 100, the UE 102A, for example, would use the data collection and update module 146 to collect the data and direct its delivery to the server 108, invoking the encryption module 148 to encrypt the data using the UE's public key. In the notation given above, this process may be thought of as comprising a transaction $t_i ::= \{update(s_j, U_i, c_j) | j=1 \ldots n\}$, where $c_j = ENC(U_{i_{pb}}, v_j)$.

At step 208, an entity receiving data, such as an advertiser $A_k$, makes a request from the entity S for data associated with the user $U_i$, through the transaction $t_k ::= \{select(s_j, U_i) | j=1 \ldots m\}$.

At step 210, upon receiving the transaction $t_i$, the entity providing storage of the data (such as the server 108 in the exemplary system 100 of FIG. 1), performs conflict detection for advertiser transactions. That is, the entity checks to see if, for the advertiser $A_k$, a current transaction is being undertaken for any of the $s_j$ tables to be updated with respect to the record identified with $U_i$. If a conflict exists, the process proceeds to step 250 and the transaction is aborted. If no conflict exists, the process proceeds to step 212 and the entity S re-encrypts the corresponding $c_j$ values and delivers them to $A_k$. The re-encryption may be designated according to the notation described above as: $\{a_j = RENC(rk_{U_i \to A_k}, c_j) | j=1 \ldots m\}$.

Next, at step 214, $A_k$ decrypts the received $a_i$ values as follows:
$\{v_j = DEC(A_{k_{pr}}, a_j) | j=1 \ldots m\}$. $A_k$ then indicates completion of the transaction by a notification to the entity S.

At step 216, carried out whenever an entity $U_i$ delivers data, the entity S performs conflict detection. The entity S examines all advertiser transactions $t_k$ to determine if any transaction exists involving the records being updated. That is, if any table for which the record associated with $U_i$ is being updated is involved in a transaction $t_k$, the transaction $t_k$ is aborted because the information will be out of date when it is delivered to the advertiser $A_k$. In addition, one or more of the entity $U_i$ and the entity S examine the delivery of data as it proceeds and, for example, retry delivery of a data element as needed to insure that a complete data set as delivered or abort delivery of the data set if a complete, current data set cannot be delivered.

Some data may be so sensitive that user does not wish to reveal it to a third party. In other cases, the users of interest are continually changing, so that the particular users whose data is most useful cannot be determined initially. In order to deal with such cases, embodiments of the invention provide mechanisms providing data to third parties only in aggregate, and for allowing users to control which parties are allowed to use their data as part of an aggregate.

Figure 3:
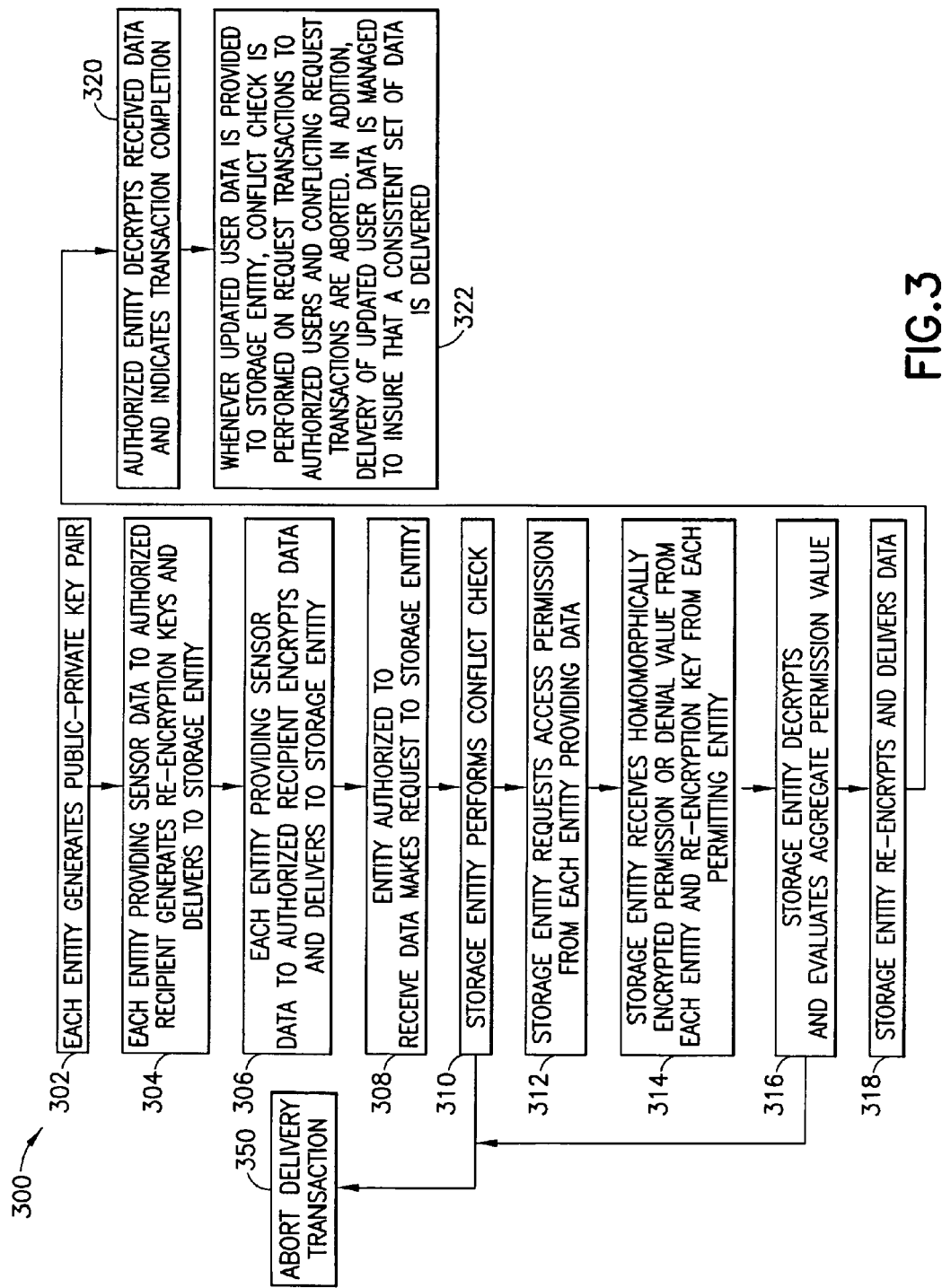
FIG. 3 illustrates a process according to an embodiment of the present invention.

FIG. 3 illustrates a process 300 of collection and management of data in aggregate, according to an embodiment of the present invention. At step 302, each entity C, runs the function $KGEN(1^k)$ to generate a public-private key pair $(C_{ipb}, C_{ipr})$. The entities $C_i$, may suitably include UEs and advertisers or other entities that may be authorized to receive user data. In the case of the system 100, the function $KGEN(1^k)$ may be performed by the key generation module 144. At step 304, each entity $U_i$, that is delivering data for the use of authorized recipients generates a re-encryption key and delivers it to a storage entity.

At step 306, each entity $U_i$ that is delivering data for the use of authorized recipients encrypts its sensor data and delivers it to a storage entity S. In the case of the system 100, the UE 102A, for example, would use the data collection and update module 146 to collect the data and direct its delivery to the server 108, invoking the encryption module 148 to encrypt the data using the UE's public key. In the notation given above, this process may be thought of as comprising a transaction $t_i ::= \{update(s_j, U_i, c_j) | j=1 \ldots n\}$, where $c_j = ENC(U_{i_{pb}}, v_j)$.

At step 308, an authorized entity such as an advertiser $A_k$ makes a request from the entity S for data associated with the user $U_{i, \ldots, p}$ through the transaction $t_k ::= \{select(s_j, U_i) | i=1, \ldots, p, j=1 \ldots m\}$. At step 310, upon receiving the transaction $t_i$, the entity providing storage of the data (such as the server 108 in the exemplary system 100 of FIG. 1), performs conflict detection for advertiser transactions. That is, the entity checks to see if, for the advertiser $A_k$, a current transaction is being undertaken for any of the s tables to be updated with respect to the record identified with $U_i$. If a conflict exists, the process proceeds to step 350 and the transaction is aborted. If no conflict exists, the process proceeds to step 312.

At step 312, the entity S requests each user $U_i$ for permission for the entity $A_k$ to use its $s_j$ data. At step 314, the entity S receives information from each entity $U_i$, depending on whether the entity that allows the access request. For each entity $U_i$ that allows the access request, the entity S receives two pieces of information. These are $d_i = ENC_H(0)$ and $rk_{U_i \to A_k} = PRK(U_{i_{pr}}, A_{k_{pb}})$. For each entity that rejects the access request, the entity S receives only $d_i = ENC_H(1)$. It will be recognized that each decision value is homomorphically encrypted, so that computations can be performed that will yield the aggregate decision value, but no individual decision value can be decrypted by the entity S.

At step 316, the entity S, upon receiving the encrypted decision values $d_i$ from all users $U_{i, \ldots, p}$, computes the value $d = DEC_H(d_1 \times \ldots \times d_p)$. If $d>0$, indicating that at least one of the entities $U_i$ refused access, the process proceeds to step 350 and the transaction $t_k$ is aborted. If $d=0$, indicating that all users allowed access, the process proceeds to step 318. At step 316, the entity S and the entity S re-encrypts the corresponding $c_j$ values and delivers them to $A_k$. The re-encryption may be designated according to the notation described above as: $\{a_{ij} = RENC(rk_{U_i \to A_k}, c_j) | i=1, \ldots, p, j=1, \ldots, m\}$.

Next, at step 320, $A_k$ decrypts the received $a_{ij}$ values as follows:
$\{v_{ij} = DEC(A_{k_{pr}}, a_{ij}) | i=1, \ldots, p, j=1 \ldots m\}$. $A_k$ then indicates completion of the transaction by a notification to the entity S.

At step 322, carried out whenever an entity $U_i$ delivers data, the entity S performs conflict detection. The entity S examines all advertiser transactions $t_k$ to determine if any transaction exists involving the records being updated. That is, if any table for which the record associated with $U_i$ is being updated is involved in a transaction $t_k$, the transaction $t_k$ is aborted because the information will be out of date when it is delivered to the advertiser $A_k$.

In addition, one or more of the entity $U_i$ and the entity S examine the delivery of data as it proceeds and, for example, retry delivery of a data element as needed to insure that a complete data set as delivered or abort delivery of the data set if a complete, current data set cannot be delivered.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

I claim:

1. An apparatus comprising:
   at least one processor;
   memory storing a program of instructions;
   wherein the program of instructions are configured to, with the processor and the memory, configure the apparatus to perform actions comprising:
   receiving sensor data encrypted with a private encryption key of a data provider;
   re-encrypting the sensor data with a re-encryption key associated with an authorized recipient identified as authorized by the data provider to receive and use sensor data contributed by the data provider; and
   upon a request from the authorized recipient associated with the re-encryption key with which the sensor data has been re-encrypted, transferring the re-encrypted sensor data to the authorized recipient.

2. The apparatus of claim 1, wherein the actions further comprise, upon receiving the request from the authorized recipient, determining if a portion of the re-encrypted sensor data corresponds to sensor data being received from the data provider and, if so, declining or aborting transfer of the re-encrypted sensor data.

3. The apparatus of claim 1, wherein the data provider is one of a plurality of data providers, and wherein the actions further comprise:
   receiving a request from an authorized recipient for data from the plurality of data providers;
   delivering an authorization request to each of the plurality of data providers;
   receiving from each of the data providers a homomorphically encrypted response indicating assent or denial;
   aggregating the homomorphically encrypted responses into an aggregated response;
   decrypting the aggregated response;
   examining the aggregated response to determine if all of the plurality of data providers responded with an assent; and
   if all of the plurality of data providers responded with an assent, re-encrypting the requested data from each of the providers with the re-encryption key associated with the authorized recipient and providing the re-encrypted data to the authorized recipient.

4. The apparatus of claim 1, wherein the actions further comprise, upon receiving data from the data provider, determining if data corresponding to the data being received is being delivered to the authorized recipient and, if so, aborting delivery of the data to the authorized recipient.

5. The apparatus of claim 1, wherein the re-encryption key associated with an authorized recipient is generated by the data provider using the public key of the authorized recipient.

6. The apparatus of claim 1, wherein the apparatus maintains data on behalf of a plurality of data providers and delivers data to a plurality of authorized recipients, and wherein the apparatus receives from each of the data providers a re-encryption key associated with each authorized recipient that may receive data generated by the data provider.

7. The apparatus of claim 1, wherein the sensor data comprises a plurality of data elements, wherein delivery of data comprises delivering a set of data elements, and wherein the actions further comprise, during the delivery of the data from the data provider, insuring that data elements of a set being delivered reflect a collection time consistent across the data elements of the set.

8. A method comprising:
configuring at least one processor to cause an apparatus to perform the steps of:
receiving sensor data encrypted with a private encryption key of a data provider;
re-encrypting the sensor data with a re-encryption key associated with an authorized recipient identified as authorized by the data provider to receive and use sensor data contributed by the data provider; and
upon a request from the authorized recipient associated with the re-encryption key with which the sensor data has been re-encrypted, transferring the re-encrypted sensor data to the authorized recipient.

9. The method of claim 8, wherein the actions further comprise, upon receiving the request from the authorized recipient, determining if a portion of the re-encrypted sensor data corresponds to sensor data being received from the data provider and, if so, declining or aborting transfer of the re-encrypted sensor data.

10. The method of claim 8, wherein the data provider is one of a plurality of data providers, and wherein the actions further comprise:
receiving a request from an authorized recipient for data from the plurality of data providers;
delivering an authorization request to each of the plurality of data providers;
receiving from each of the data providers a homomorphically encrypted response indicating assent or denial;
aggregating the homomorphically encrypted responses into an aggregated response;
decrypting the aggregated response;
examining the aggregated response to determine if all of the plurality of data providers responded with an assent; and
if all of the plurality of data providers responded with an assent, re-encrypting the requested data from each of the providers with the re-encryption key associated with the authorized recipient and providing the re-encrypted data to the authorized recipient.

11. The method of claim 10, wherein the actions further comprising receiving a re-encryption key from each of the assenting data providers.

12. The method of claim 8, wherein the actions further comprise, upon receiving data from the data provider, determining if data corresponding to the data being received is being delivered to the authorized recipient and, if so, aborting delivery of the data to the authorized recipient.

13. The method of claim 8, wherein the re-encryption key associated with an authorized recipient is generated by the data provider using the public key of the authorized recipient.

14. The method of claim 8, wherein the apparatus maintains data on behalf of a plurality of data providers and delivers data to a plurality of authorized recipients, and wherein the apparatus receives from each of the data providers a re-encryption key associated with each authorized recipient that may receive data generated by the data provider.

15. A non-transitory computer readable medium storing a program of instructions, execution of which by a processor configures an apparatus to perform actions comprising:
receiving sensor data encrypted with a private encryption key of a data provider;
re-encrypting the sensor data with a re-encryption key associated with an authorized recipient identified as authorized by the data provider to receive and use sensor data contributed by the data provider; and
upon a request from the authorized recipient associated with the re-encryption key with which the sensor data has been re-encrypted, transferring the re-encrypted sensor data to the authorized recipient.

16. The non-transitory computer readable medium of claim 15, wherein the actions further comprise, upon receiving the request from the authorized recipient, determining if a portion of the re-encrypted sensor data corresponds to sensor data being received from the data provider and, if so, declining or aborting transfer of the re-encrypted sensor data.

17. The non-transitory computer readable medium of claim 15, wherein the data provider is one of a plurality of data providers, and wherein the actions further comprise:
receiving a request from an authorized recipient for data from the plurality of data providers;
delivering an authorization request to each of the plurality of data providers;
receiving from each of the data providers a homomorphically encrypted response indicating assent or denial;
aggregating the homomorphically encrypted responses into an aggregated response;
decrypting the aggregated response;
examining the aggregated response to determine if all of the plurality of data providers responded with an assent; and
if all of the plurality of data providers responded with an assent, re-encrypting the requested data from each of the providers with the re-encryption key associated with the authorized recipient and providing the re-encrypted data to the authorized recipient.

18. The non-transitory computer readable medium of claim 17, wherein the actions further comprise receiving a re-encryption key from each of the assenting data providers.

19. The non-transitory computer readable medium of claim 15, wherein the actions further comprise, upon receiving data from the data provider, determining if data corresponding to the data being received is being delivered to the authorized recipient and, if so, aborting delivery of the data to the authorized recipient.

20. The non-transitory computer readable medium of claim 15, wherein the apparatus maintains data on behalf of a plurality of data providers and delivers data to a plurality of authorized recipients, and wherein the apparatus receives from each of the data providers a re-encryption key associated with each authorized recipient that may receive data generated by the data provider.

* * * * *